July 14, 1953 — F. M. BLAKELEY — 2,645,258
UNIVERSAL JOINT BEARING CUP HOLDER
Filed June 4, 1952
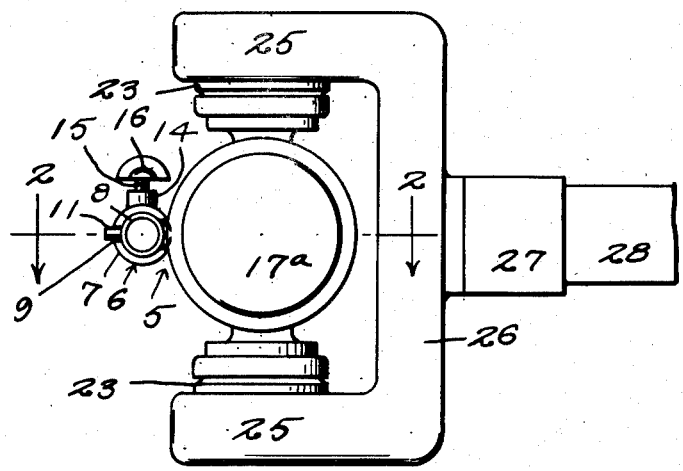
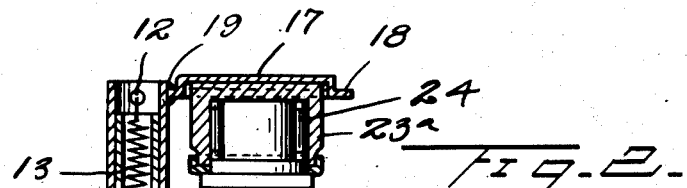
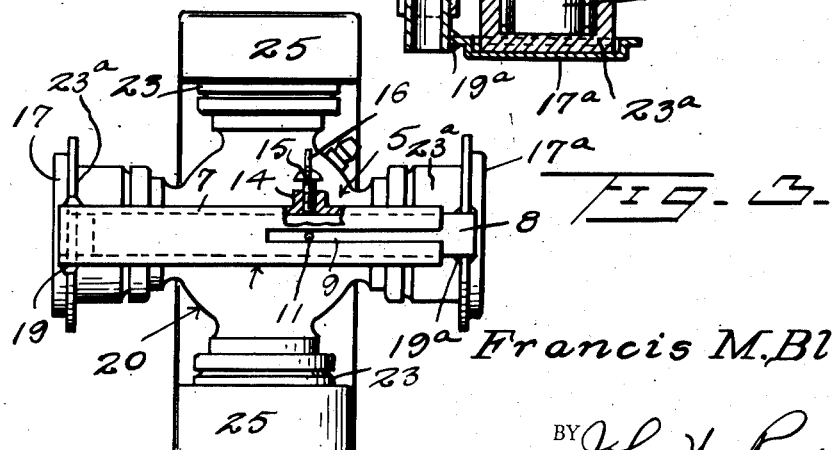
INVENTOR
Francis M. Blakeley
BY John H. Randolph
ATTORNEY Patented July 14, 1953

2,645,258

UNITED STATES PATENT OFFICE 2,645,258

UNIVERSAL JOINT BEARING CUP HOLDER

Francis M. Blakeley, Clayton, N. Mex.

Application June 4, 1952, Serial No. 291,741

3 Claims. (Cl. 144—299)

This invention relates to a novel holder of extremely simple construction adapted to be attached to two oppositely disposed arms of a universal joint connecting a drive shaft to a transmission or differential after disconnection of the universal joint from the transmission or differential, for retaining the needle bearing cups on the terminals of said arms to prevent loss of the needle bearings by the cups dropping off of the arms while the drive shaft is removed from the differential or transmission.

More particularly, it is an object of the present invention to provide a holder of extremely simple construction which may be readily attached over a pair of needle bearing cups of the universal joint after the universal joint has been disconnected from a driving or driven element such as a transmission or differential, respectively, and which will effectively retain the cups in properly applied positions to exclude dust from the bearings and to prevent loss of the needle bearings from the cups.

Various other objects and advantages of the invention will hereinafter become more fully apparent from the following description of the drawing, illustrating a presently preferred embodiment thereof, and wherein:

Figure 1 is an end elevational view showing the holder in an applied position;

Figure 2 is a longitudinal sectional view of the holder taken substantially along a plane as indicated by the line 2—2 of Figure 1, and Figure 3 is a side elevational view, partly in section, looking from left to right of Figure 1.

Referring more specifically to the drawing, the needle bearing cup holder in its entirety is designated generally 5 and comprises a tube, designated generally 6, formed of telescopically connected tubular sections including an outer section 7 and an inner section 8 which slidably fits in the outer section 7. The outer section 7 is provided with a longitudinally extending slot 9 which extends from intermediate of its ends and which opens outwardly of one end thereof. A pin 10 extends diametrically through the inner tube 8 at a point spaced from its ends and is secured therein and has a protruding end 11 extending outwardly from the outer tube 7 through the slot 9, in which said pin portion 11 is slidably disposed for slidably and non-turnably connecting the telescopic tube sections 7 and 8.

A stop pin 12 extends diametrically through and is anchored in the outer tube 7, near the end thereof disposed remote to the slot 9, beyond an inner, adjacent end of the inner tube 8. The pin 12 forms a stop for limiting telescopic movement of the inner tube 8 into the outer tube 7 and additionally forms an anchor to which one end of a pull spring 13 is secured. The pull spring 13 extends from the pin 12 into and partially through the inner tube 8 and is connected at its opposite end to the pin 10 for urging the tube 8 inwardly of the tube 7 into a telescoped position.

As best seen in Figures 1 and 3, the outer tube 7 near its first mentioned slotted end and remote to the stop pin 12 is provided with an internally threaded boss 14 which is circumferentially spaced from the slot 9 and in which is mounted a setscrew 15 having a head 16 adapted to be engaged and manually turned for advancing the setscrew inwardly into clamping engagement with the inner tube 8 to secure the tube at various extended positions, or which head 16 may be turned in the opposite direction to disengage the setscrew 15 from the tube 8 to enable the tubes to telescope or be drawn inwardly of one another by the pull spring 13.

A shallow socket member 17 has an outturned flange 18 a portion of which is secured to the outer tube 7, at the end thereof provided with the stop pin 12, as by means of welding, as indicated at 19. The socket 17 projects transversely from the tube 7 and is disposed on the side thereof opposite to the slot 9 and is also circumferentially as well as longitudinally spaced from the boss 14. A corresponding socket 17a is similarly secured as by welding, as indichated at 19a to the exposed end of the inner tube 8, which is located remote to the end of the tube 7 to which the socket 17 is secured. The sockets 17 and 17a open inwardly or toward one another and are disposed in alignment and are so maintained due to the fact that the pin portion 11 by engagement with the slot 9 prevents the tubes 7 and 8 turning relatively to one another.

A conventional universal joint 20 of the type commonly used for connecting a drive shaft to a transmission and to a differential, is illustrated in the drawing. Said universal joint 20 is provided with crossarms 21, each of which terminates in a spindle or stub shaft 22. A bearing cup 23 is mounted on each stub shaft 22 and forms a housing for a plurality of needle bearings 24 interposed between the cup 23 and spindle 22 on which said cup is mounted. The bearing cups 23 of two oppositely disposed aligned spindles 22 are engaged by the terminals 25 of a yoke 26 having a sleeve or socket 27 projecting outwardly from its intermediate or bight portion in which an end of a drive shaft 28 is keyed, in a conventional manner, not shown. Ordinarily, the terminals of a second yoke, not shown, are connected to the bearing cups 23a of the other two aligned spindles 22 and the sleeve or socket of the second yoke is keyed to a driving element of a transmission or a driven element of a differential, not shown.

However, when the drive shaft 28 is disconnected from either the transmission or differential or from both the transmission and differential, the transmission and/or differential yoke, not shown, is disconnected from the aligned bearing cups 23a. In order to prevent these bearing cups 23a from falling off of the spindles 22 on which they are mounted and which results in the needle bearings 24 being lost from the cups, the needle bearing cup holder 5 is applied to the cups 23a as illustrated in the drawing, when the drive shaft 28 is disconnected from the transmission and/or the differential, so that the cups 23a will be effectively retained in fully applied positions as illustrated in Figure 2 to prevent the needle bearings 24 from escaping therefrom and also to prevent dust and dirt from reaching the spindles 22 while the drive shaft 28 is being moved about. To apply the holder 5, it is merely necessary to loosen the setscrew 15, after which the outer tube 7 may be held in the fingers of one hand and a finger or thumb of the other hand may be pressed against the pin end 11 for displacing the inner tube 8 outwardly of the tube 7, to thereby displace the sockets 17 and 17a away from one another so that said sockets can be positioned beyond the outer ends of the cups 23a. Pressure is then released from the pin end 11 and the pull spring 13 will draw the tube 8 inwardly of the tube 7 to displace the socket 17a toward the socket 17 so that the cups 23a will be engaged by said sockets and held tightly therebetween against outward displacement. The setscrew 15 may be re-tightened to positively prevent the sockets being displaced away from one another and out of engagement with the bearing cups 23a until the holder 5 is removed from the universal joint 20 for re-connecting the universal joint to the transmission or differential yoke.

Various modifications and changes are contemplated and may obviously be resorted to, without departing from the spirit or scope of the invention as hereinafter defined by the appended claims.

I claim as my invention:

1. A needle bearing cup holder for universal joints comprising inner and outer telescopically connected members, socket members, means securing the socket members to remote outer ends of said telescopically connected members in laterally spaced relationship to the axis of said telescopic members, said socket members being disposed normally in alignment and opening inwardly and being adapted to engage against the outer remote ends of a pair of needle bearing cups of aligned spindles of a universal joint for retaining the cups in positions on the spindles, and means resisting displacement of the socket members away from one another and out of engagement with the cups, said means resisting displacement of the socket members away from one another comprising a setscrew threaded radially into an outer one of the telescopic members and engaging the other inner telescopic member, when the setscrew is in an advanced position, to prevent movement of the telescopic members relatively to one another.

2. A needle bearing cup holder for universal joints comprising inner and outer telescopically connected members, socket members, means securing the socket members to remote outer ends of said telescopically connected members in laterally spaced relationship to the axis of said telescopic members, said socket members being disposed normally in alignment and opening inwardly and being adapted to engage against the outer remote ends of a pair of needle bearing cups of aligned spindles of a universal joint for retaining the cups in positions on the spindles, and means resisting displacement of the socket members away from one another and out of engagement with the cups, said telescopic members being tubular, a stop pin extending diametrically through the outer telescopic member adjacent the socket supported by said member and forming a stop to engage an inner end of the inner telescopic member to limit inward movement of the inner member relatively to the outer telescopic member, a pull spring disposed in said telescopic members having one end connected to said stop pin, and means connecting the other end of the pull spring to the inner telescopic member, said pull spring forming the means resisting displacement of the socket members away from one another.

3. A needle bearing cup holder as in claim 2, and a setscrew threaded radially into the outer telescopic member and engaging the inner telescopic member when in an advanced position to retain said telescopic members against sliding movement relatively to one another, said setscrew being longitudinally and circumferentially spaced from the socket member supported by said outer telescopic member.

FRANCIS M. BLAKELEY.

References Cited in the file of this patent

UNITED STATES PATENTS

| Number | Name | Date |
|---|---|---|
| 2,228,715 | Wollner | Jan. 14, 1941 |
| 2,403,718 | Hauck | July 9, 1946 |